Dec. 31, 1935.  W. H. TSCHAPPAT  2,025,793
SUSPENSION FOR VEHICLES
Filed Nov. 15, 1933
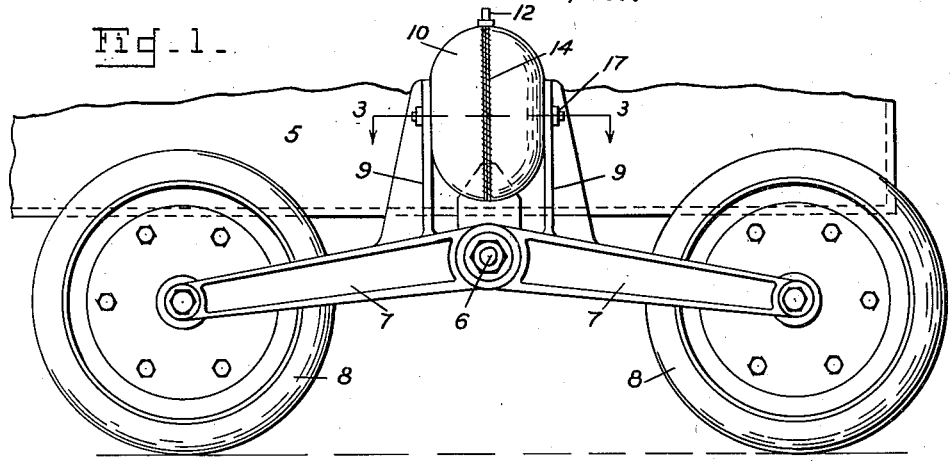
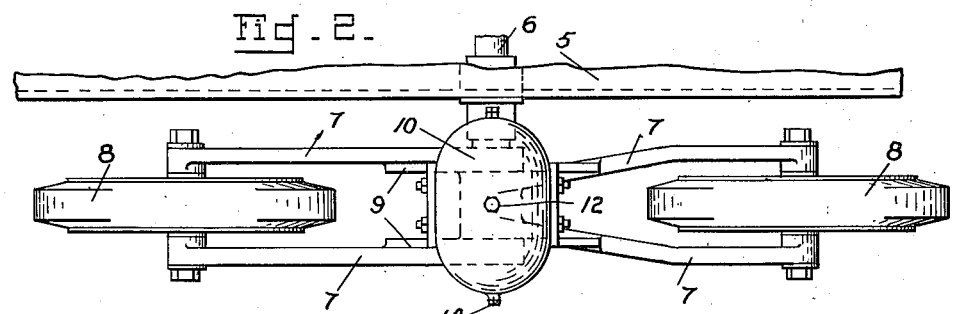
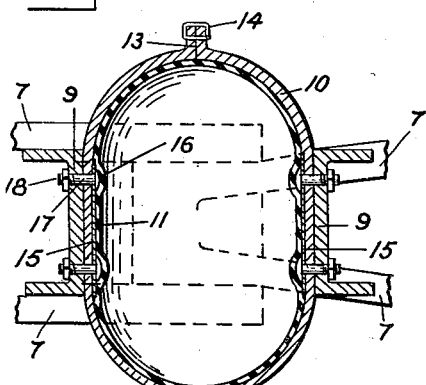
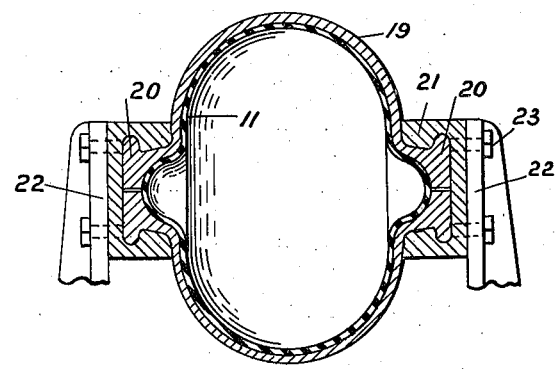
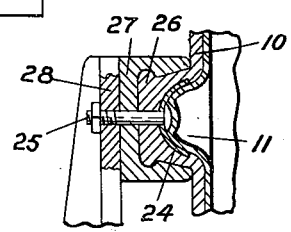
Inventor
William H. Tschappat
By W. M. Roach
Attorney Patented Dec. 31, 1935

2,025,793

UNITED STATES PATENT OFFICE 2,025,793

SUSPENSION FOR VEHICLES

William H. Tschappat, United States Army, Washington, D. C.

Application November 15, 1933, Serial No. 698,144

1 Claim. (Cl. 280—104)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a suspension for vehicles.

The purpose of the invention is to provide a simple and compact suspension device which is particularly applicable to a pair of levers carrying the wheels of the vehicle.

The invention consists generally in disposing an elastic cushioning member between arms of a pair of levers to yieldingly oppose rotation of the levers about the hubs of wheels on the ends of the levers.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in side elevation of a suspension constructed in accordance with the invention.

Fig. 2 is a plan view of the suspension.

Fig. 3 is a sectional view on the line 3—3 of Fig. 1.

Fig. 4 is a sectional view of a modified form of cushioning means.

Fig. 5 is a sectional view showing a modification of the securing means of Fig. 4.

Referring to Figs. 1 to 3 there is shown a portion of a vehicle comprising a body or load member 5 having a dead axle 6 on which a pair of levers 7—7 are pivotally mounted at each side of the body. The levers extend in opposite directions and each one carries a wheel 8 on its free end.

Each of the levers 7 includes an upright arm 9 intermediate its ends and preferably only a short distance from its pivoted end. The two upright arms 9—9 are therefore spaced to receive between them a shock-absorbing or cushioning unit in the nature of a ball or balloon. The unit comprises a casing 10 for containing an elastic element and when the element is fluent, such as air, a separate container or bladder 11 is provided and it is equipped with a valve 12 for the admission of air. The casing 10 is preferably formed with openings 13—13 at opposite ends, either one of which may be used to insert the bladder. The openings 13 are conveniently closed by a lacing 14.

Referring to Fig. 3 the casing 10 is held in position between the upright arms 9—9 by being attached to at least one of the arms. A rigid plate 15 on the inside of the casing forms a bearing for the heads 16 of bolts 17 which pass through the casing 10 and arm 9 and are secured by nuts 18.

In the modification shown in Fig. 4 the opposite walls of the casing 19 are each provided with a bulge formed by beaded flanges 20—20 which are adapted to slidably enter a channeled member 21 secured to the upper part of each upright arm 22 by means of bolts 23. The elastic element in the casing serves to hold the flanges in place.

In the modification shown in Fig. 5 a rigid plate 24 is placed on the inside of the bulge and bolts 25 bearing thereon, pass through the flanges 26, channeled member 27, and arm 28.

In operation, the load member 5 because of its weight tends to depress the inner ends of the levers and rotate them about the hub of the respective wheels. This action is opposed by the elastic cushioning members which act on the spaced upright arms 9 to yieldingly limit the rotation of the levers and thereby provide a resilient suspension for the load member.

I claim:—

A pneumatic suspension device for vehicles consisting of a pair of spaced supporting members each having a transversely disposed channel on its inner side, a casing disposed between the channeled supporting members, a bulge on opposite walls of the casing and including beaded flanges engageable in the channels of the supporting members, and an inflatable bladder in the casing extending between the beaded flanges and holding them in place in the channels of the supporting members.

WILLIAM H. TSCHAPPAT.